United States Patent
Bhattacharya et al.

(10) Patent No.: US 12,334,056 B2
(45) Date of Patent: Jun. 17, 2025

(54) METHOD AND APPARATUS FOR CONDITIONING NEURAL NETWORKS

(71) Applicant: Samsung Electronics Co., Ltd., Suwon-si (KR)

(72) Inventors: Sourav Bhattacharya, Staines (GB); Abhinav Mehrotra, Staines (GB); Alberto Gil C. P. Ramos, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 358 days.

(21) Appl. No.: 17/874,826

(22) Filed: Jul. 27, 2022

(65) Prior Publication Data

US 2022/0375462 A1    Nov. 24, 2022

Related U.S. Application Data

(63) Continuation of application No. PCT/KR2022/006899, filed on May 13, 2022.

(30) Foreign Application Priority Data

May 14, 2021  (GB) ..................................... 2106969
May 11, 2022  (EP) ..................................... 22172819

(51) Int. Cl.
   *G10L 15/16* (2006.01)
   *G10L 21/0208* (2013.01)
(52) U.S. Cl.
   CPC .......... *G10L 15/16* (2013.01); *G10L 21/0208* (2013.01)
(58) Field of Classification Search
   CPC ..... G10L 15/16; G10L 21/0208; G10L 13/02; G10L 15/063; G10L 15/06; G10L 17/02; G10L 17/18; G06N 3/045; G06N 3/048; G06N 3/082
   See application file for complete search history.

(56) References Cited

U.S. PATENT DOCUMENTS

| | | |
|---|---|---|
| 11,301,961 B2 | 4/2022 | Takeshima |
| 11,538,455 B2 | 12/2022 | Zhou et al. |
| 2016/0140951 A1* | 5/2016 | Agiomyrgiannakis ..................... G10L 13/02 704/260 |
| 2019/0130904 A1 | 5/2019 | Homma et al. |
| 2019/0220744 A1 | 7/2019 | Yao |

(Continued)

FOREIGN PATENT DOCUMENTS

| | | |
|---|---|---|
| CN | 108898213 A | 11/2018 |
| CN | 110522464 A | 12/2019 |

(Continued)

OTHER PUBLICATIONS

European Office Action dated Mar. 21, 2024, issued in a European Patent Application No. 22 172 819.9-1203.
European Office Action dated Jul. 13, 2023, issued in a European Patent Application No. 22172 819.9-1203.
Alberto Gil C. P. Ramos et al., Conditioning Sequence-to-Sequence Models With Learned Activation Functions, Sep. 29, 2021, XP055974624, Published as a conference paper at ICLR 2022.

(Continued)

*Primary Examiner* — Huyen X Vo
(74) *Attorney, Agent, or Firm* — Jefferson IP Law, LLP

(57) ABSTRACT

Broadly speaking, the present techniques provide methods for conditioning a neural network, which not only improve the generalizable performance of conditional neural networks, but also reduce model size and latency significantly. The resulting conditioned neural network is suitable for on-device deployment due to having a significantly lower model size, lower dynamic memory requirement, and lower latency.

13 Claims, 16 Drawing Sheets

(56) References Cited

U.S. PATENT DOCUMENTS

| | | | |
|---|---|---|---|
| 2019/0385600 A1 | 12/2019 | Kim | |
| 2020/0066296 A1 | 2/2020 | Sargsyan et al. | |
| 2020/0250542 A1* | 8/2020 | Li | G06N 3/084 |
| 2020/0372361 A1* | 11/2020 | Ehteshami Bejnordi | G06N 3/063 |
| 2020/0387798 A1 | 12/2020 | Hewage | |
| 2020/0411032 A1 | 12/2020 | Van Den Oord et al. | |
| 2021/0089903 A1 | 3/2021 | Murray | |
| 2021/0117727 A1 | 4/2021 | Gur et al. | |
| 2021/0383190 A1 | 12/2021 | Park et al. | |
| 2022/0254052 A1* | 8/2022 | Sekii | G06T 7/50 |

FOREIGN PATENT DOCUMENTS

| | | |
|---|---|---|
| KR | 10-2083635 B1 | 3/2020 |
| KR | 10-2020-0089588 A | 7/2020 |

OTHER PUBLICATIONS

Yinpeng Chen et al., Dynamic ReLU, arXiv:2003.10027v2 [cs.CV] Aug. 5, 2020, XP047584685.

Sebastian Baunsgaard et al., Training for Speech Recognition on Co-processors, arXiv:2003.12366v1 [eess.AS] Mar. 22, 2020, XP081630820.

Forest Agostinelli et al., Learning Activation Functions to Improve Deep Neural Networks, arXiv:1412.6830v3 [cs.NE] Apr. 21, 2015, XP055509750.

Pawel Swietojanski et al., Learning Hidden Unit Contributions for Unsupervised Acoustic Model Adaptation, arXiv:1601.02828v2 [cs.CL] Jul. 13, 2016, XP055976450.

European Search Report dated Nov. 14, 2022, issued in European Application No. 22172819.9.

International Search Report dated Aug. 12, 2022, issued in International Application No. PCT/KR2022/006899.

* cited by examiner

FIG. 6B
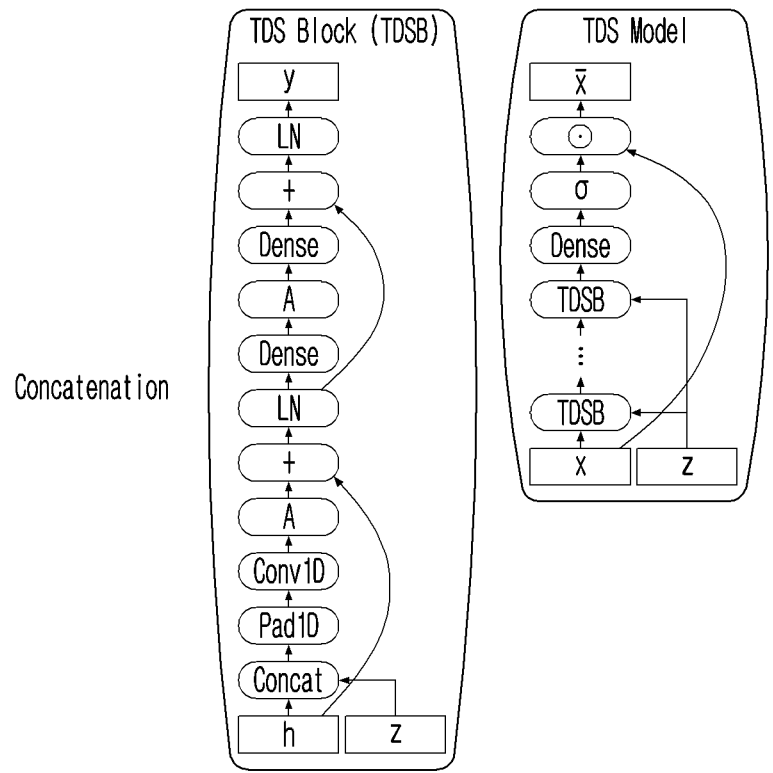
Concatenation
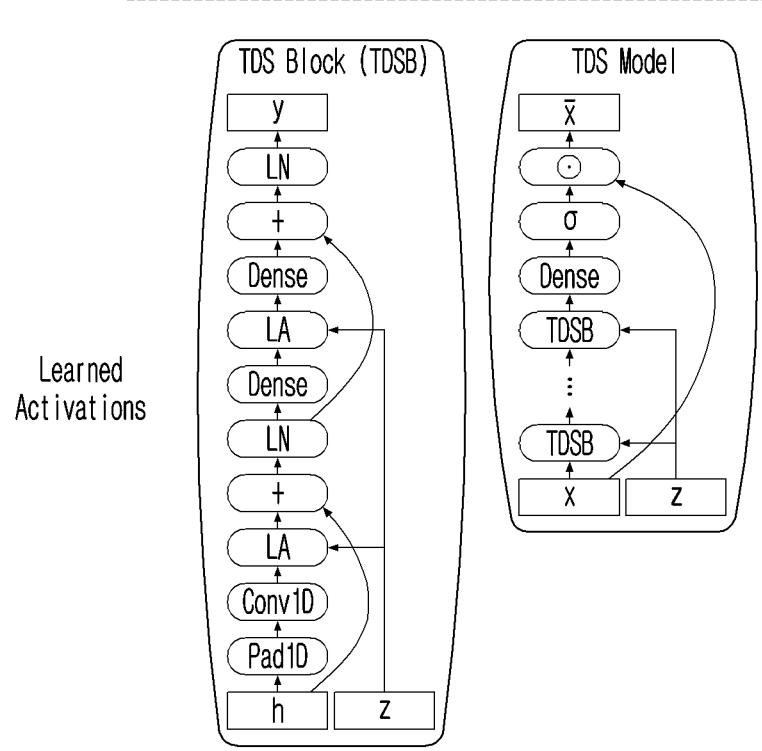
Learned Activations

FIG. 6C
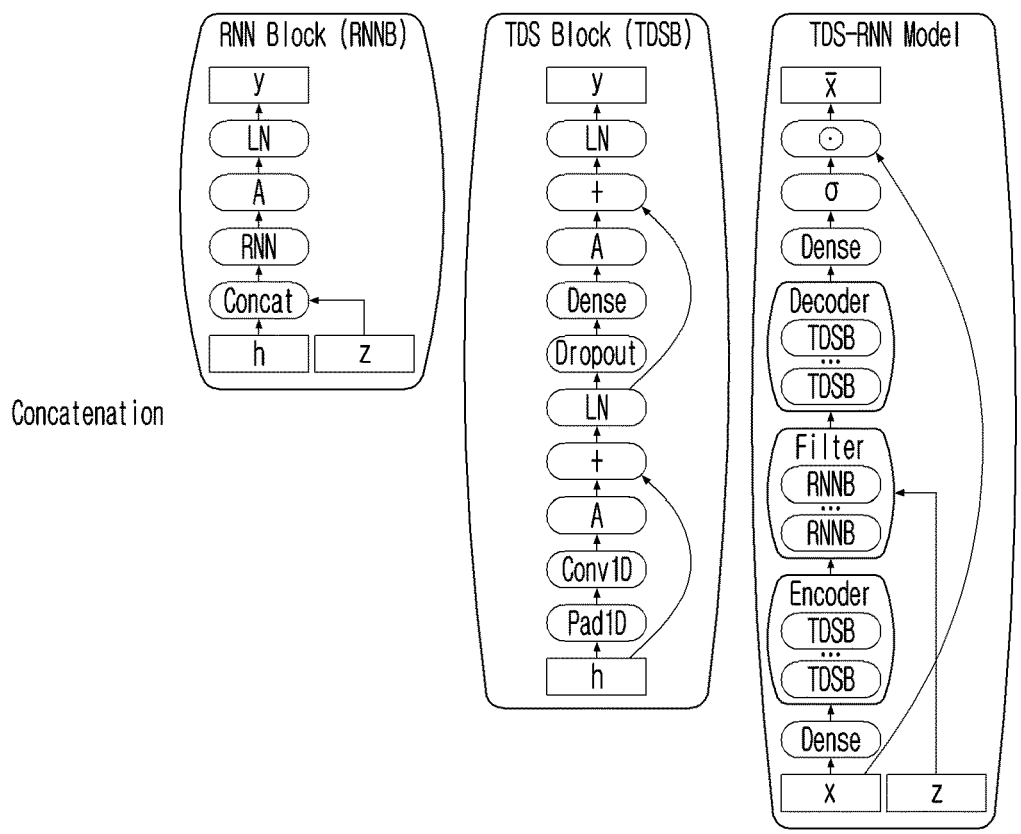
Concatenation
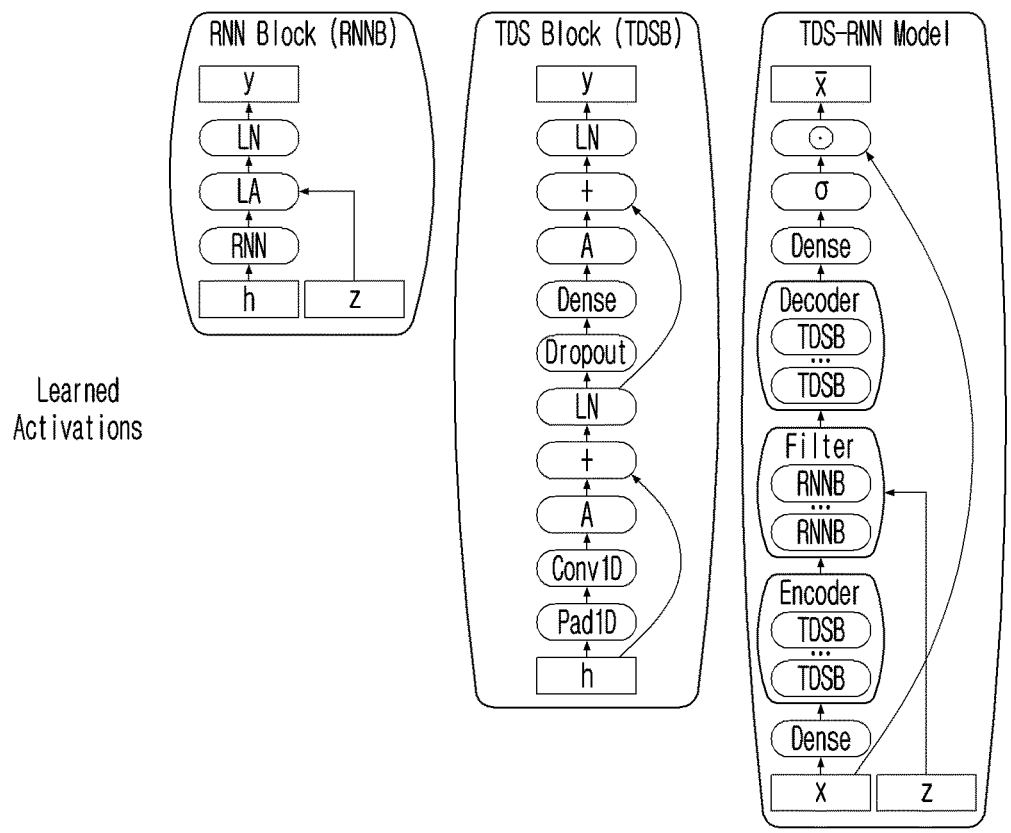
Learned Activations

Model trained without regularizers

Model trained without t-SNE regularizers

Embd. vector

METHOD AND APPARATUS FOR CONDITIONING NEURAL NETWORKS

CROSS-REFERENCE TO RELATED APPLICATION(S)

This application is a continuation application, claiming priority under § 365(c), of International application No. PCT/KR2022/006899, filed on May 13, 2022, which is based on and claims the benefit of a United Kingdom patent application number 2106969.5, filed on May 14, 2021, in the United Kingdom Intellectual Property Office, and of a European patent application number 22172819.9, filed on May 11, 2022, in the European Patent Office, the disclosure of each of which is incorporated by reference herein in its entirety.

BACKGROUND

1. Field

The present application generally relates to a method and a server for conditioning a neural network, and in particular, to a method for conditioning a neural network without increasing the size of the neural network.

2. Description of the Prior Art

Conditional neural networks play an important role in a number of sequence-to-sequence modelling tasks, such as personalised sound enhancement (PSE), speaker dependent automatic speech recognition (ASR), and generative modelling such as text-to-speech synthesis. The use of conditional neural networks is also common in other areas, e.g., in computer vision.

In conditional neural networks, the output of a model is often influenced by a conditioning vector, in addition to the input into the model. Common approaches for conditioning neural networks include input concatenation or modulation with the conditioning vector, which comes at a cost of increased model size. For example, these techniques may significantly increase the network parameters by inflating the dimensionality of input features before they are passed through a neural network layer, or by requiring additional network parameters proportional to the dimensionality of the conditioning vectors multiplied by the number of channels in the representations. The concatenation of a conditioning vector increases the weight matrix size, thereby increasing dramatically the model size, dynamic memory as well as the overall latency.

As such, previous approaches to conditioning have worked only in limited scenarios, often powered by powerful servers working off-line (e.g. for demonstration purposes), making such approaches inappropriate for on-device deployment.

The present applicant has recognised the need for a method to reduce the model size and improve the efficiency of conditional neural networks.

SUMMARY

The present techniques generally relate to a conditioning mechanism that dynamically modifies the manner in which non-linear activations process inputs into outputs based on conditioning vectors, unlike conventional approaches that condition the linear parts of the network.

In a first approach of the present techniques, there is provided a computer-implemented method for training, on a server, a neural network having a plurality of layers, where each layer is associated with an initial activation function, the method comprising: obtaining a training dataset comprising a plurality of tuples, each tuple comprising a conditioning vector and input data, to be processed by the neural network; and training the neural network by: applying the conditioning vector of each tuple to the initial activation function of at least one layer; generating a conditioned activation function for the at least one layer; and processing the input data of each tuple using the plurality of layers of the neural network, including the at least one layer having a conditioned activation function, to generate output data.

It will be understood that the term "neural network" is used herein to mean a machine learning model, and the neural network may be multiple neural networks.

Advantageously the conditioning mechanism of the present techniques achieves a performance similar to existing conditioning methods, while also producing compact machine learning models suitable for deployment on resource-constrained apparatus, such as smartphones and Internet of Things 'IoT' devices. Moreover, the disclosed mechanism, which learns activation mappings, can more easily be inspected by analysing the learned activations, which are independent of any intermediate representations in the network.

A conditioning vector is a vector that encodes data for conditioning the neural network with respect to a particular task, such as sound enhancement, speech enhancement, text-to-speech conversion, music generation, generative modelling, and automatic speech recognition.

As noted above, the training dataset used to train the neural network comprises tuples. The tuples may be of the form (z, x, y), where z is the conditioning vector, x is the input data, and y is the corresponding ground truth. For each tuple, the conditioning vector is applied to initial activation function to generate a conditioned activation function, and then this is used to process the input data. The ground truth is used to train the neural network using any suitable supervised or semi-supervised learning approach.

Training the neural network may comprise using a regularisation technique to reduce variation in the conditioned activation functions of the layers of the neural network. The regularisation technique may comprise using at least one regulariser. As explained in more detail below, different non-linear functions may require different amounts of available computational resources, and thus, regularisation may help to bias the conditioned activation functions towards a single known form. One class of example regularisers biases the coefficients to favour one of the basic activation functions (e.g. an entropy regulariser). In this way the conditioned activation function is toward a particular one of the basic activation functions. Biasing toward a particular known form of activation can significantly improve efficiency of the conditioned network when deployed. Similarly, it is desirable that similar conditioning vectors yield similar conditioned activation functions, but there may be subtle differences between conditioning vectors that may prevent this. Another class of example regularisers may preserve the geometry of the conditioning vector in the conditioned activation which therefore better trains the conditioned activation function when the conditioning vector data is highly clustered (e.g. t-distributed stochastic neighbour embedding). Thus, regularisation may help to reduce the impact of these differences in the conditioning vectors.

Generally speaking, applying the conditioning vector of each tuple to the initial activation function may comprise using the conditioning vector to modify a function that acts element-wise on results of a linear part of the at least one layer. Preferably, the method may further comprise using the conditional activations to condition learned layers of the neural network. In other words, the conditioning vector may be used to generate a conditioned activation function, which is turn used to condition the network by applying the conditioned activation function to a layer of the neural network, in place of basic activation functions which would normally be applied to that layer of the network.

Applying the conditioning vector of each tuple to the initial activation function of at least one layer may comprise: modifying weights of the initial activation function using the conditioning vector. At the start of the training process, the model may be unbiased and thus, at initialisation time, the initial activation function for each layer may provide the same or nearly the same weight for each input. Once the training begins, the conditioning vectors may change these uniform weights to other values.

Additionally or alternatively, applying the conditioning vector of each tuple to the initial activation function of at least one layer may comprise: modifying at least one characteristic of the initial activation function using the conditioning vector. At the start of the training process, the model may begin with initial activation functions of a specific shape (which may depend on the function being performed by the model for example). Once the training begins, the conditioning vectors may change the shape of the initial activation functions. Shape is one example of a characteristic of the initial activation function.

Modifying at least one characteristic of the initial activation function may comprise searching for an optimal activation function and modifying at least one characteristic of the initial activation function based on the optimal activation function.

The neural network may be for sound enhancement and/or automatic speech recognition. That is, the neural network may be used to improve the quality of audio comprising speech, which may enable a speaker to be more clearly heard and understand, and for downstream tasks such as automatic speech recognition to be performed more accurately. In this case, the input data of each tuple of the training dataset may comprise at least one audio noise sample and at least one clean audio sample that each contain speech of individual speakers, and the conditioning vector may be a speaker embedding vector for each individual speaker. Training the neural network may then comprise training the neural network to remove the noise from the corrupted audio samples while maintaining the speech of the individual speakers. Any suitable technique may be used to train the neural network to remove the noise.

In some cases, it may be necessary to generate the conditioning vector itself. This may be achieved, for example, by passing a reference data item through an embedding network, wherein the reference data item is an audio data item comprising speech of a specific speaker, and wherein passing the reference data item through an embedding network comprises learning sound characteristics of the specific speaker. Thus, the method may further comprise generating the speaker embedding vector for each individual speaker by: obtaining at least one clean audio signal for an individual speaker; and applying a speaker recognition model to the at least one clean audio signal to generate a speaker embedding vector representing a speech profile of the individual speaker. Any suitable speaker recognition model may be used to generate a speaker embedding vector for each individual speaker using the clean audio samples for that speaker.

The neural network may be for text-to-speech conversion. In this case, the input data of each tuple of the training dataset may comprise at least one text sample and a corresponding audio sample, and the conditioning vector may be an embedding vector representing a target voice for the speech. The conditioning vector may be used to modify the gender or pitch of the output speech, for example.

The result of the training is a conditional neural network that has learned how to apply a conditioning vector to the activation function of at least one layer and to process input data. Once the neural network has been trained using the training dataset, the trained neural network may be personalised for a target user. The trained conditional neural network may be personalised on-device (i.e. on a user device) without requiring any additional training. To do so, a conditioning vector is obtained for the or each target user of a user device, and the trained conditional neural network uses the conditioning vector for a target user when processing the target user's data (or data for the target user). In one example, where the neural network is for sound or speech enhancement, the neural network has been trained to, for example, remove noise from audio containing speech. However, it may be useful to further personalise the neural network so that it can recognise a target user and ensure their speech is retained in audio containing speech and noise (e.g. ambient noise and/or babble noise).

The trained, conditioned neural network may for sound enhancement and/or automatic speech recognition, and thus the conditioning vector for the target user may be a speaker embedding vector for the target user.

In a second approach of the present techniques, there is provided a server for training a neural network having a plurality of layers, where each layer is associated with an initial activation function, the server comprising: at least one processor coupled to memory and arranged to: obtain a training dataset comprising a plurality of tuples, each tuple comprising a conditioning vector and input data, to be processed by the neural network; and train the neural network by: applying the conditioning vector to the initial activation function of at least one layer; generating a conditioned activation function for the at least one layer; and processing the input data of each tuple using the plurality of layers of the neural network, including the at least one layer having a conditioned activation function, to generate output data.

The features described above with respect to the first approach apply equally to the second approach, and are therefore not repeated.

In a third approach of the present techniques, there is provided a computer-implemented method for using, on a user device, a trained neural network having a plurality of layers, the method comprising: obtaining a conditioning vector for a target user of the user device; obtaining an input data item; and processing the input data item using the trained neural network by: applying the conditioning vector to an initial activation function of at least one layer; generating a conditioned activation function for the at least one layer; and processing the input data item using the plurality of layers of the neural network, including the layers having a conditioned activation function; outputting output data from the neural network.

The trained neural network may be for sound enhancement and/or automatic speech recognition. Thus, the conditioning vector for the target user may be a speaker embedding vector for the target user. The method may further comprise generating the speaker embedding vector for the target user by: obtaining at least one clean audio signal of the target user; and applying a speaker recognition model to the at least one clean audio signal of the target user to generate the speaker embedding vector representing a speech profile of the target user. The target user may take part in an enrolment process to provide a sample of their voice (i.e. the clean audio signal containing just the user's voice). This enrolment process only needs to be performed once per user.

In a fourth approach of the present techniques, there is provided an apparatus for using a trained neural network having a plurality of layers, the apparatus comprising: at least one processor coupled to memory and arranged to: obtain a conditioning vector for a target user of the apparatus; obtain an input data item; and process the input data item using the trained neural network by: applying the conditioning vector to an initial activation function of at least one layer; generating a conditioned activation function for the at least one layer; and processing the input data item using the plurality of layers of the neural network, including the layers having a conditioned activation function; outputting output data from the neural network.

The features described above with respect to the third approach apply equally to the fourth approach, and are therefore not repeated.

The apparatus may be a constrained-resource device, but which has the minimum hardware capabilities to use a trained neural network. The apparatus may be any one of: a smartphone, tablet, laptop, computer or computing device, virtual assistant device, a vehicle, an autonomous vehicle, a robot or robotic device, a robotic assistant, image capture system or device, an augmented reality system or device, a virtual reality system or device, a gaming system, an Internet of Things device, or a smart consumer device (such as a smart fridge). It will be understood that this is a non-exhaustive and non-limiting list of example apparatus.

The present techniques therefore provide a general approach for neural network conditioning, which not only improves the generalizable performance of conditional neural networks, but also reduces model size and latency significantly. The approach does not rely on the layers to condition the input. Instead, the network is made to learn the non-linearities based on the conditioning vector, and these are then applied to any layers where conditioning is to be performed.

This method for conditioning networks is advantageous because it provides superior quality of conditional neural networks, and because it provides improved efficiency for on-device deployment due to significantly lower model size, dynamic memory and latency.

In a related approach of the present techniques, there is provided a computer-readable storage medium comprising instructions which, when executed by a processor, causes the processor to carry out the methods described herein.

As will be appreciated by one skilled in the art, the present techniques may be embodied as a system, method or computer program product. Accordingly, present techniques may take the form of an entirely hardware embodiment, an entirely software embodiment, or an embodiment combining software and hardware aspects.

Furthermore, the present techniques may take the form of a computer program product embodied in a computer readable medium having computer readable program code embodied thereon. The computer readable medium may be a computer readable signal medium or a computer readable storage medium. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

Embodiments of the present techniques also provide a non-transitory data carrier carrying code which, when implemented on a processor, causes the processor to carry out any of the methods described herein.

The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier. The code may be provided on a carrier such as a disk, a microprocessor, CD- or DVD-ROM, programmed memory such as non-volatile memory (e.g. Flash) or read-only memory (firmware), or on a data carrier such as an optical or electrical signal carrier. Code (and/or data) to implement embodiments of the techniques described herein may comprise source, object or executable code in a conventional programming language (interpreted or compiled) such as Python, C, or assembly code, code for setting up or controlling an ASIC (Application Specific Integrated Circuit) or FPGA (Field Programmable Gate Array), or code for a hardware description language such as Verilog® or VHDL (Very high speed integrated circuit Hardware Description Language). As the skilled person will appreciate, such code and/or data may be distributed between a plurality of coupled components in communication with one another. The techniques may comprise a controller which includes a microprocessor, working memory and program memory coupled to one or more of the components of the system.

It will also be clear to one of skill in the art that all or part of a logical method according to embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method.

The method described above may be wholly or partly performed on an apparatus, i.e. an electronic device, using a machine learning or artificial intelligence model. The model may be processed by an artificial intelligence-dedicated processor designed in a hardware structure specified for artificial intelligence model processing. The artificial intelligence model may be obtained by training. Here, "obtained by training" means that a predefined operation rule or artificial intelligence model configured to perform a desired feature (or purpose) is obtained by training a basic artificial intelligence model with multiple pieces of training data by a training algorithm. The artificial intelligence model may include a plurality of neural network layers. Each of the plurality of neural network layers includes a plurality of weight values and performs neural network computation by computation between a result of computation by a previous layer and the plurality of weight values.

As mentioned above, the present techniques may be implemented using an AI model. A function associated with AI may be performed through the non-volatile memory, the volatile memory, and the processor. The processor may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU). The one or a plurality of processors control the processing of the input data in accordance with a predefined operating rule or artificial intelligence (AI) model stored in the non-volatile memory and the volatile memory. The predefined operating rule or artificial intelligence model is provided through training or learning. Here, being provided through learning means that, by applying a learning algorithm to a plurality of learning data, a predefined operating rule or AI model of a desired characteristic is made. The learning may be performed in a device itself in which AI according to an embodiment is performed, and/or may be implemented through a separate server/system.

The AI model may consist of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

BRIEF DESCRIPTION OF THE DRAWINGS

Implementations of the present techniques will now be described, by way of example only, with reference to the accompanying drawings, in which:

FIGS. 6A, 6B, and 6C are schematic diagrams that compares the present techniques to an existing technique for conditioning a neural network;

DETAILED DESCRIPTION

Broadly speaking, the present techniques provide methods for conditioning a neural network, which not only improve the generalizable performance of conditional neural networks, but also reduce model size and latency significantly. The resulting conditioned neural network is suitable for on-device deployment due to having a significantly lower model size, lower dynamic memory requirement, and lower latency.

Figure 1A:
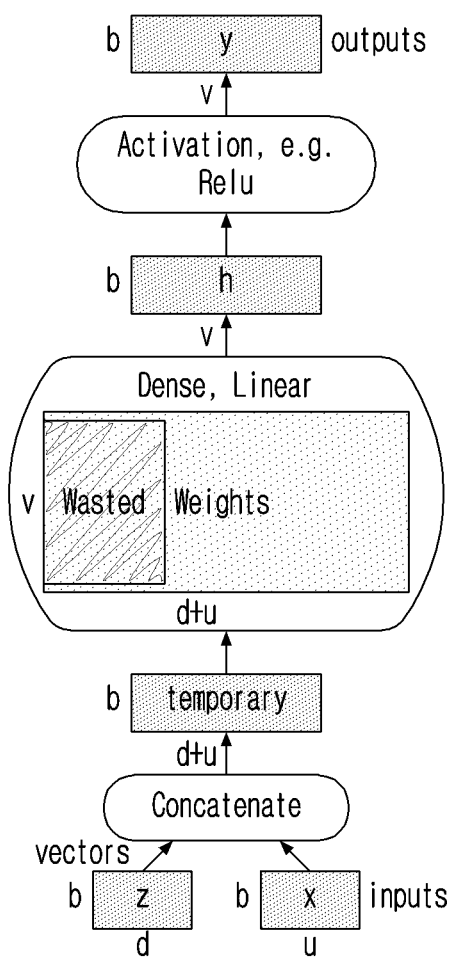
FIGS. 1A and 1B are schematic diagrams of two existing approaches for conditioning a neural network.

FIG. 1A is a schematic diagram showing an existing approach for conditioning a neural network. Specifically, FIG. 1A shows how inputs x to a neural network are first concatenated with a latent (conditioning) vector z, as part of the conditioning process. The result is then processed by the layers of the neural network. The concatenation of intermediate features with conditioning vectors before being passed to subsequent layers is the most common form of conditioning. Although the location along the depth of the neural network where concatenation takes place is often subject to trial and error, when it works, this form of conditioning often provides very good results in terms of quality of the machine learning system, i.e., accuracy. Formally, concatenation approaches (FIG. 1A) can be defined by $A_{elementwise}(F_\theta([z_j^T, x_{j,\ldots,:}^T]^T))$, where $F_\theta$ denotes a common learnable transformation such as a dense, conv1d, conv2d or LSTM layer without activation and $A: \mathbb{R} \to \mathbb{R}$ denotes a generic activation such as the rectified linear unit.

Figure 1B:
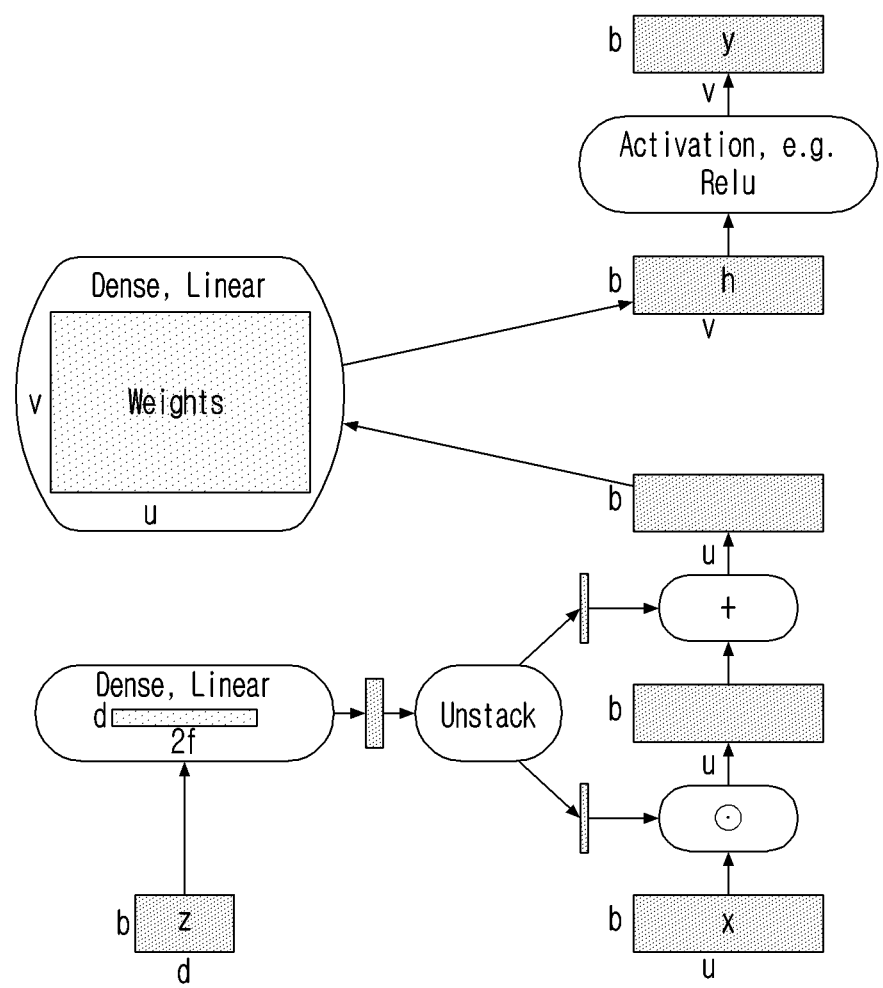

FIG. 1B is a schematic diagram showing another existing approach for conditioning a neural network. Specifically, FIG. 1B shows a modulation approach. Modulation approaches are defined as $A_{elementwise}(G_\eta(U_\mu(z_j) \odot x_{j,\ldots,:} + V_\nu(z_j)))$, where $G_\eta$ represents a common learnable transformation (which may be slightly different than $F_\theta$ given their inputs have different shapes) and $U_\mu: \mathbb{R}^d \to \mathbb{R}^f$ and $V_\nu: \mathbb{R}^d \to \mathbb{R}^f$ are often taken as linear mappings (where d denotes the conditioning vectors dimension and f denotes the number of channels of x).

State-of-the-art conditioning mechanisms have several issues from a deployability point of view, however, which originate in the expensive concatenation mechanism they rely on which:

Requires too many parameters (e.g., weights and biases) and are thus unsuitable for on-device deployment. This can be seen from the illustration in FIG. 1A, where the wiggled weights required by the approach increase the number of parameters significantly, making such models unsuitable for on-device deployment on a wide range of hardware, and particularly hinders their deployment to low-resource constrained devices.

Requires high dynamic memory. Indeed, not only the number of parameters, but also the number of intermediate results is very significantly increased. This can also be visualized from FIG. 1A, where the temporary vector which is required in state-of-the-art approaches as a result of concatenation represents a significant bloat to run time efficiency. In detail, given that for low latency matrix multiplication one requires data to be layout in memory in efficient ways (say sequentially in row-order or column-order), one actually needs to allocate write to and read from the entire temporary vector. This is especially pronounced in time series data where each time frame of the inputs needs to be concatenated with the vectors.

Results in increased latency, not just due to increased computation but also due to increased read/write from/to memory.

The present techniques overcome the need for concatenation by instead learning how to condition activation functions based on conditioning information and yields smaller models with similar or higher quality.

Figure 2:
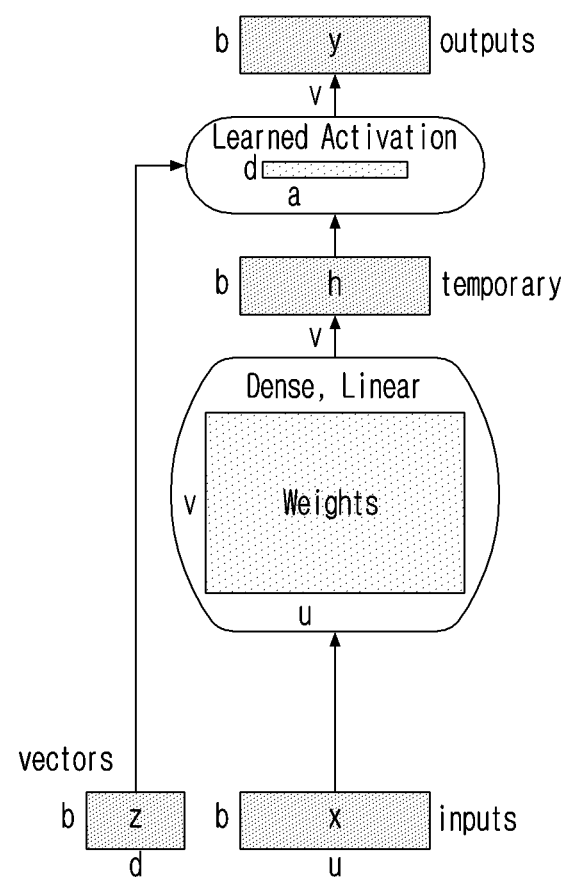
FIG. 2 is a schematic diagram showing the present technique for conditioning a neural network.

FIG. 2 is a schematic diagram showing the present techniques for conditioning a neural network. Here, the inputs into a neural network are not concatenated with conditioning vectors, during the training phase or during inference. Rather than conditioning the networks by concatenating inputs with conditioning vectors before passing them through the linear and non-linear parts of a layer (e.g., Dense, Conv, LSTM, GRU, etc), as done in state-of-the-art techniques, the present techniques provide an efficient alternative, which is designed to bridge the gap in on-device deployment of conditional neural networks, and which leverages the conditioning vectors to instead modify the non-linear part of the layer, i.e., to modify the function that acts element-wise on the results of the linear part of the layer as depicted in FIG. 2.

More specifically, the present techniques condition neural networks by learning layer-specific activation functions based on the conditioning vectors. Unlike previous approaches, such as concatenation or modulation, the present disclosure utilises a learned activations (LA) approach which does not significantly increase the model parameters. Instead, the number of parameters used depends only on the size of the conditioning vector, and not on the shape of the representations nor on the output shapes of any subsequent layer. Thus the conditioning vectors are used to dynamically modify the activation functions, which are 1-D functions mapping $\mathbb{R} \to \mathbb{R}$ and are independent of intermediate representations. Furthermore, as the approach is based on adapting activation functions, rather than on modifying intermediate representations, it is possible to extract insights on how the model is being adapted for different conditioning vectors by analysing the learned activations, which is agnostic to the input.

Given the proposed conditioned activations avoid the need to concatenate inputs and vectors, the present techniques address all the issues highlighted above and therefore provide significant savings in terms of i) number of parameters, ii) dynamic memory, and iii) latency.

Conditioning a neural network corresponds to using some form of latent vector or additional prior knowledge, e.g., encoded typically in the form of an embedding vector, to influence the output of the network for a given input. The present applicant shows in the evaluation below that the influence of the conditioning vector can be successfully modelled by learning a weighted combination of a set of basic activation functions, and carefully selecting hyperparameters.

Dynamically Learned Activations. To introduce the conditioning mechanism of the present techniques which is based on dynamically weighted activations, it is useful to consider the key variables: $z \in \mathbb{R}^{b \times d}$ is a 2-D tensor representing b number of d-dimensional conditioning vectors, where b is the batch size, $x \in \mathbb{R}^{b \times}$... is the input data with arbitrary tensor dimensions (e.g., vectors, matrices, higher order tensors), $h \in \mathbb{R}^{b \times}$... is the hidden pre-activation of a previous layer, and $\{A_i : \mathbb{R} \to \mathbb{R}\}_{i=1}^{a}$ is an ordered family of a basic activations e.g. {elu, exponential, hard_sigmoid, linear, relu, selu, sigmoid, softplus, softsign, swish, tanh}.

Given this, the dynamically learned activation (LA) functions utilise a small number of trainable variables $w \in \mathbb{R}^{d \times a}$ and $b \in \mathbb{R}^{1 \times a}$, and are defined by transforming input tuples (z,h) into output tensors y through:

$$s := softmax_{rowwise}(z \times w + b),$$

$$h \in \mathbb{R} \mapsto LA(h|z_j) := \sum_{i=1}^{a} s_{j,i} \cdot A_i(h),$$

$$y_{j,...} := LA_{elementwise}(h_{j,...}|z_j).$$

where $softmax_{rowwise}$ denotes the matrix-matrix operation with entries defined rowwise via $softmax_{rowwise}(m)_j := softmax(m_j)$, and $LA_{elementwise}(h_j, \ldots |z_j)$ denotes the result of applying $LA(\cdot|z_j)$ elementwise to each entry of $h_j, \ldots$.

Note, that during training, batch size is greater than one in which case z is a matrix, whereas during inference batch size is one for each user in which case z is a row vector. So during training $z_j$ is the conditioning vector corresponding to the j-th sample, but during inference $z_j$ is the conditioning vector corresponding to the j-th user in the discussion below.

In practice, for each user of a system utilising the conditional neural network, the trainable variables w and b are used to create the set of coefficients s by which the set of pre-defined basic activations a are modified to produce learned activations for that user. That is, w and b transform (in this example in combination with the $softmax_{rowwise}$ function, though other functions could in principle also be used) the usually high dimensional vector z to the vector s with same dimensionality as the number of pre-defined basic activations a. Training the conditional neural network therefore includes training the variables w and b to best map the high dimensional vector z to low dimensional vector s. Thus the network may be personalized for that user by the unique (learned) activations. Moreover, additional bloat which arises from concatenation of z with x in the prior art techniques may be avoided.

Figure 5:
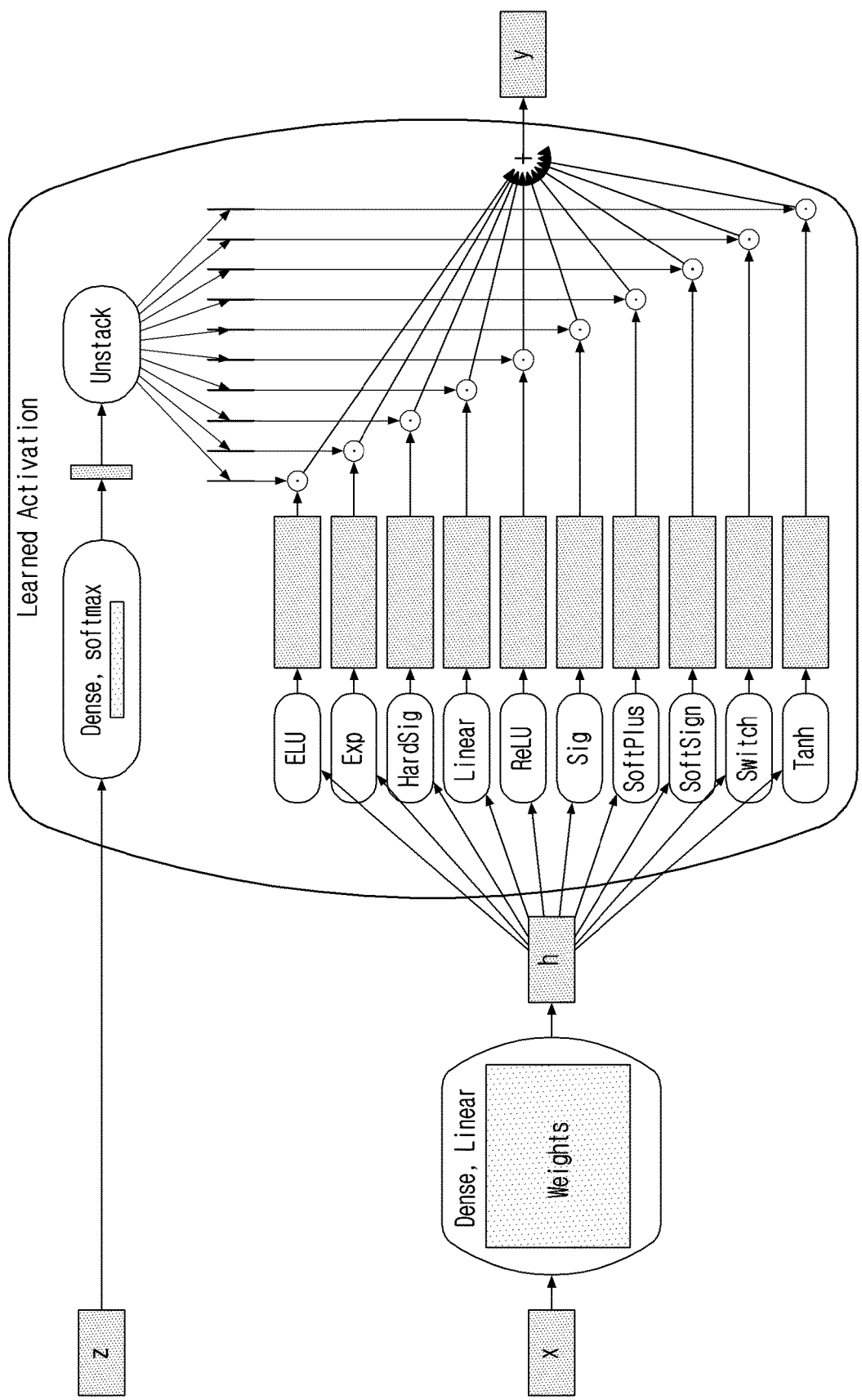
FIG. 5 is a schematic diagram showing details of the present techniques for conditioning a neural network.
Figure 6A:
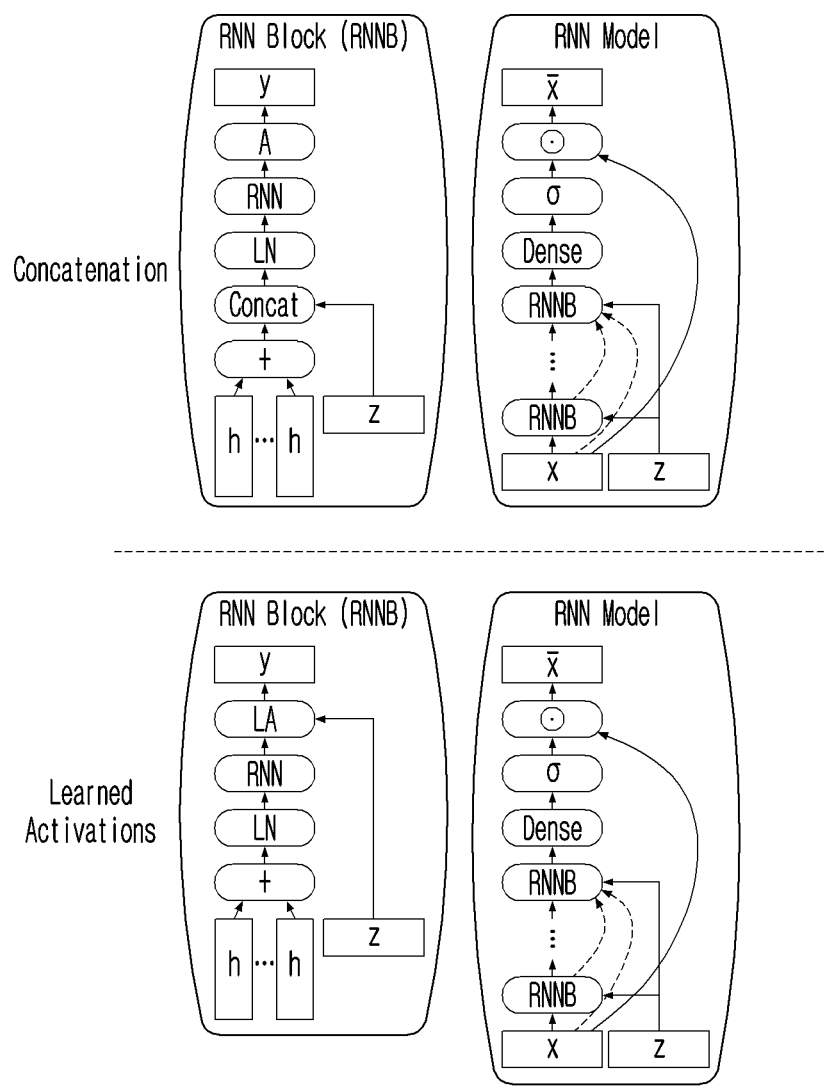

While FIG. 2 presents a high-level depiction of the present techniques where, for simplicity, bias are omitted from the diagrams, FIG. 5 presents a low-level illustration of the present techniques. This, as described below, results in significant savings in terms of i) number of parameters, ii) dynamic memory, and iii) latency. FIG. 5 shows how conditioning is achieved by using the conditioning vectors to provide coefficients for the activation functions consistent with the equations above. Although FIGS. 2 and 5 show a Dense layer, this is merely for illustrative purposes and the present conditioning techniques work with any layer of the neural network, including but not limited to conv1d, conv2d and LSTM layers.

Figure 4:
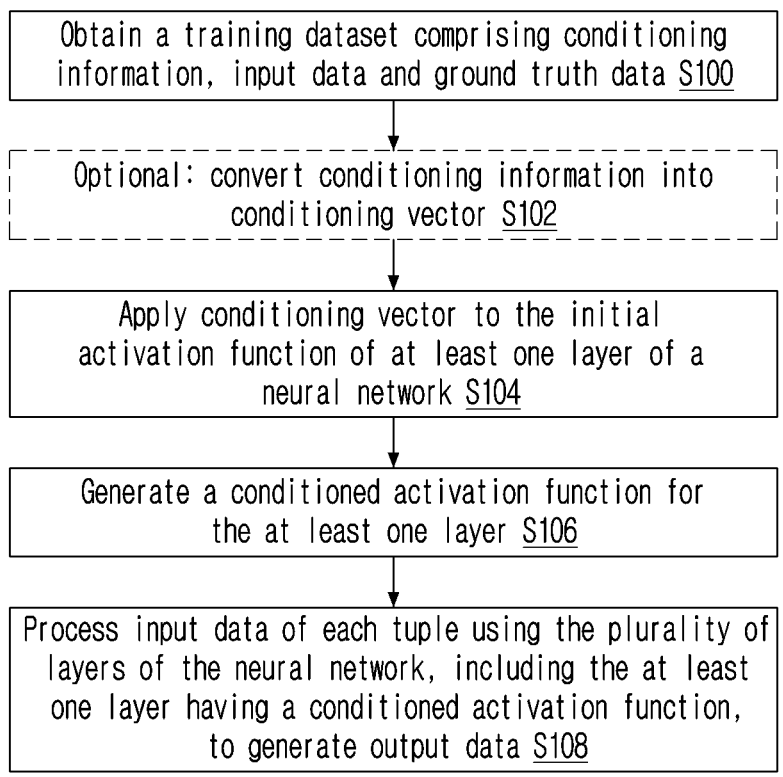
FIG. 4 is a flowchart of example steps to train a conditional neural network using the present techniques.

Differences between the present learned activation technique and the prior art techniques can be visualised by comparing FIG. 2 with FIGS. 1A and 1B (for an example case of a dense layer). FIG. 4 shows a further pictorial representation of concatenation and the present technique applied to a recurrent neural network 'RNN' (a), a stacked time-depth-separable 'TDS' convolution blocks network (b) and a TDS-RNN (c).

In comparison to the existing approaches, the present learned activations mechanism can be formulated as $LA_{elementwise}(G_\eta(X_j, \ldots)|z_j)$. For ease of understanding it is convenient to consider primarily dense layers in the figures (i.e., take $F_\theta$ and $G_\eta$ to be dense layers and f=1), however the approach is general and can be applied to any layer type, e.g. dense, conv1d, conv2d and LSTM. From a qualitative point of view, the approach conditions the non-linearities rather than the linearities of the network. From a quantitative point of view, FIGS. 1A, 1B and 2 highlight the superior compression abilities achieved by the learned activations method.

In particular, the concatenation approach (FIG. 1A) requires require (d+u)*v parameters, whereas the present learned activations approach (FIG. 2) use u*v+d*a; this represents significant savings of d*(v−a) given that d>>1 and v>>a in most audio and video applications. Even more significant than number of parameters, the proposed approach requires less dynamic memory and have lower latency. Modulation approaches (FIG. 1B) require u*v+d*2*f, where f denotes the number of channels in the input tensor x, which per channel is multiplied by a scaling factor and offset by a bias term. Thus the saving of the present learned activations approach becomes d*(2*f−a) when compared to modulation approaches, given that often in such cases 2*f−a>0.

Note that for temporal data such as audio and video, the savings of the current approach are even more significant given that in those applications the conditioning vectors are concatenated with each time frame of the inputs and for f>>1 the model requires larger parameter size, resulting in much larger requirements, whereas in the current approach the operational requirements do not change across data type, i.e., tensor dimensions.

For any application the construction of models with the proposed solutions follows standard practices wherein non-conditioned static activations such as ReLU layers are replaced with the proposed conditional activations learned with conditioning vectors.

Training

Figure 3:
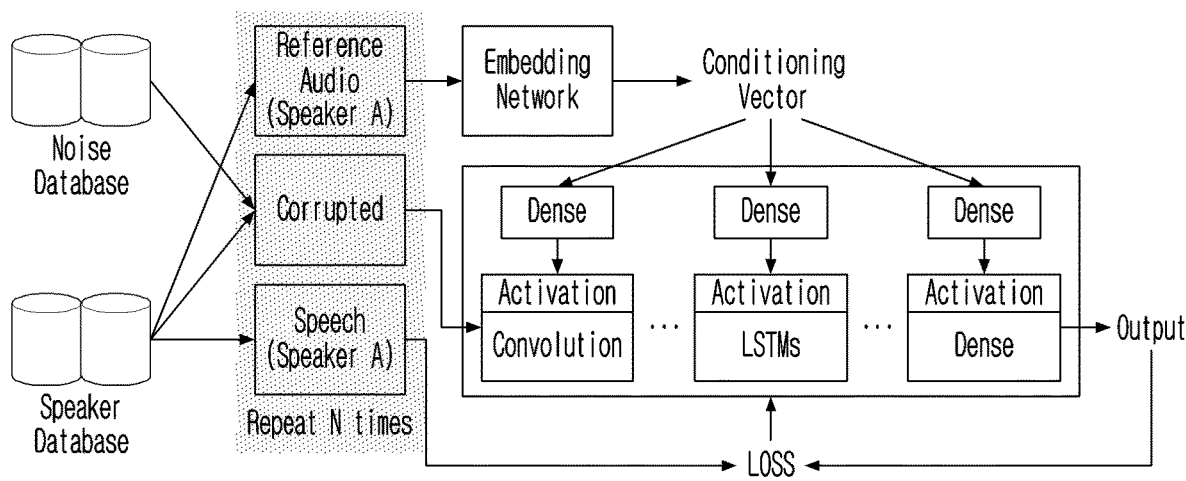
FIG. 3 is a block diagram illustrating a training process of the present techniques to train a conditional neural network for personalised sound enhancement.

FIG. 3 is a block diagram illustrating a training process of the present techniques to train a conditional neural network. The training process is illustrated with respect to a specific use case, i.e. personalised sound enhancement or speaker dependent automatic speech recognition (ASR). However, it will be understood that the training process may be used for other use cases/applications. As shown, reference data of the source speaker is passed through the embedding network to obtain conditioning vector, which is used to learn the personalised activation functions. Now, the network is trained to filter out any signal that does not belong to the source speaker by the help of conditional activations. Specifically, corrupted speech (i.e., source speaker's speech and noise) is passed through the network and the output is brought close to the original speech of source speaker.

More specifically, the training process comprises obtaining a training dataset comprising a plurality of tuples, each tuple comprising a conditioning vector and input data, to be processed by the neural network. For each tuple, the conditioning vector may be a speaker embedding vector for each individual speaker. The input data may be corrupted audio samples, which may be generated by adding at least one noise sample (taken from the noise database) to each clean audio sample (taken from the speaker database) of an individual user. The corrupted audio samples may comprise entirely overlaying the speech in a clean audio sample with an audio noise sample, and/or partially overlaying the speech in a clean audio sample with an audio noise sample. The noise sample may be ambient (environmental) noise and/or babble noise. In this way, input data is generated for use to train the neural network. In parallel, for each speaker, a conditioning vector may be generated using, for example, an embedding network. This conditioning vector is then used in the training process.

FIG. 4 is a flowchart of example steps to train, one a server, a conditional neural network. The neural network has a plurality of layers, where each layer is associated with an initial activation function. The method begins by obtaining a training dataset to be processed by the neural network (S100). The training dataset comprises a plurality of tuples, each tuple comprising a conditioning vector and input data. For example, the conditioning vector may be a speaker embedding vector, and the input data may comprise at least one corrupted audio sample featuring speech of the same speaker.

The initial activation function may be non-linear functions to be applied to a linear layer of the network. Of course it will be appreciated that the initial activation functions may include linear functions also. By way of example, the at least one layer may be a Dense Linear layer, and the identified initial activation functions may be non-linear functions {elu, exponential, hard_sigmoid, linear, relu, selu, sigmoid, softplus, softsign, swish, tanh} (c.f. FIGS. 2 to 4).

Training the neural network may comprise using a regularisation technique to reduce variation in the conditioned activation functions of the layers of the neural network, as explained above. The regularisation technique may comprise using at least one regulariser. As explained in more detail below, different non-linear functions may require different amounts of available computational resources, and thus, regularisation may help to bias the conditioned activation functions towards a single known form. One class of example regularisers biases the coefficients to favour one of the basic activation functions (e.g. an entropy regulariser). In this way the conditioned activation function is toward a particular one of the basic activation functions. Biasing toward a particular known form of activation can significantly improve efficiency of the conditioned network when deployed. Similarly, it is desirable that similar conditioning vectors yield similar conditioned activation functions, but there may be subtle differences between conditioning vectors that may prevent this. Another class of example regularisers may preserve the geometry of the conditioning vector in the conditioned activation which therefore better trains the conditioned activation function when the conditioning vector data is highly clustered (e.g. t-distributed stochastic neighbour embedding). Thus, regularisation may help to reduce the impact of these differences in the conditioning vectors.

The neural network may be for sound enhancement and/or automatic speech recognition. That is, the neural network may be used to improve the quality of audio comprising speech, which may enable a speaker to be more clearly heard and understand, and for downstream tasks such as automatic speech recognition to be performed more accurately. In this case, the training dataset may comprise a plurality of audio noise samples and a plurality of clean audio samples that each contain speech of individual speakers, and the at least one conditioning vector may be a speaker embedding vector for each individual speaker. Training the neural network may then comprise training the neural network to remove the noise from the corrupted audio samples while maintaining the speech of the individual speakers. Any suitable technique may be used to train the neural network to remove the noise.

In some cases, it may be necessary to generate the conditioning vector itself (step S102). This may be achieved, for example, by passing a reference data item through an embedding network, wherein the reference data item is an audio data item comprising speech of a specific speaker, and wherein passing the reference data item through an embedding network comprises learning sound characteristics of the specific speaker. Thus, the method may further comprise generating the speaker embedding vector for each individual speaker by: obtaining at least one clean audio signal for an individual speaker; and applying a speaker recognition model to the at least one clean audio signal to generate a speaker embedding vector representing a speech profile of the individual speaker. Any suitable speaker recognition model may be used to generate a speaker embedding vector for each individual speaker using the clean audio samples for that speaker.

The training method further comprises training the neural network by applying the at least one conditioning vector to the initial activation function of at least one layer (S104). Applying the at least one conditioning vector to the initial activation function of at least one layer may comprise: modifying weights of the initial activation function using the at least one conditioning vector. At the start of the training process, the model may be unbiased and thus, at initialisation time, the initial activation function for each layer may provide the same or nearly the same weight for each input. Once the training begins, the conditioning vectors may change these uniform weights to other values. Additionally or alternatively, applying the at least one conditioning vector to the initial activation function of at least one layer may comprise: modifying at least one characteristic of the initial activation function using the at least one conditioning vector. At the start of the training process, the model may begin with initial activation functions of a specific shape (which may depend on the function being performed by the model for example). Once the training begins, the conditioning vectors may change the shape of the initial activation functions. Shape is one example of a characteristic of the initial activation function. Modifying at least one characteristic of the initial activation function may comprise searching for an optimal activation function and modifying at least one characteristic of the initial activation function based on the optimal activation function.

Thus, the method may comprise generating a conditioned activation function for the at least one layer (S106). The method may comprise processing the input data of each tuple using the plurality of layers of the neural network, including the at least one layer having a conditioned activation function, to generate output data (step S108).

Inference

The result of the training is a conditional neural network that has learned how to apply a conditioning vector to the activation function of at least one layer and to process input data. Once the neural network has been trained using the training dataset, the trained neural network may be personalised for a target user. The trained conditional neural network may be personalised on-device (i.e. on a user device) without requiring any additional training. To do so, a conditioning vector is obtained for the or each target user of a user device, and the trained conditional neural network uses the conditioning vector for a target user when processing the target user's data (or data for the target user). In one example, where the neural network is for sound or speech enhancement, the neural network has been trained to, for example, remove noise from audio containing speech. However, it may be useful to further personalise the neural network so that it can recognise a target user and ensure their speech is retained in audio containing speech and noise (e.g. ambient noise and/or babble noise).

Figure 9:
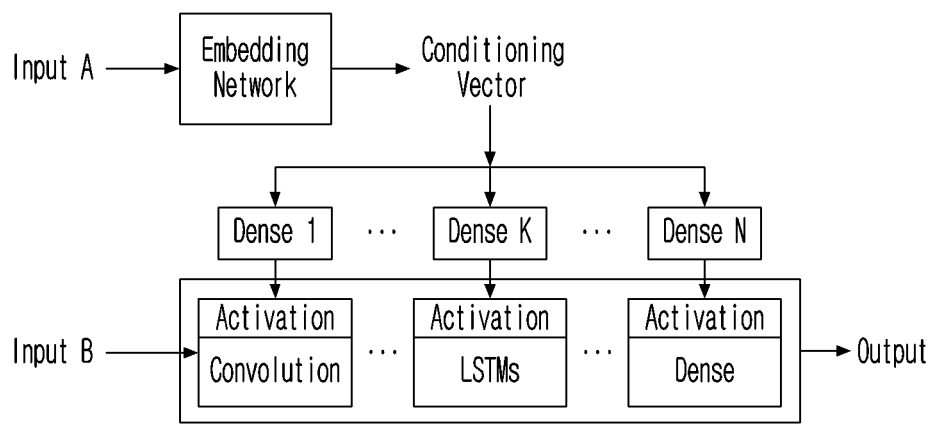
FIG. 9 is a block diagram illustrating how a conditional neural network is used to process input data at inference time according to the present techniques.

FIG. 9 is a block diagram illustrating how a conditional neural network is used to process input data at inference time according to the present techniques. As shown, Input-A (i.e., conditioning data) is optionally passed through the embedding network to obtain a low dimensional conditioning vector. For example, in case of personalized sound enhancement or speaker dependent automatic speech recognition (ASR) we would use speaker's enrolment data and would obtain a lower dimensional conditioning vector from that. Whereas, for the case of text-to-speech (TTS) conditioning vector would be gender (discrete), accent (continuous), speed of spoken output (continuous), etc, which are not required to be pre-processed for obtaining their low dimensional representations. Finally, the conditioning vector is then used to learn activation functions for specific conditions. These conditional activations are then used to condition the learned layers, which as depicted in the figure can be used together with any type of linear layers such as Dense, Conv or without non-linear layers such as LSTM/GRU.

Figure 10:
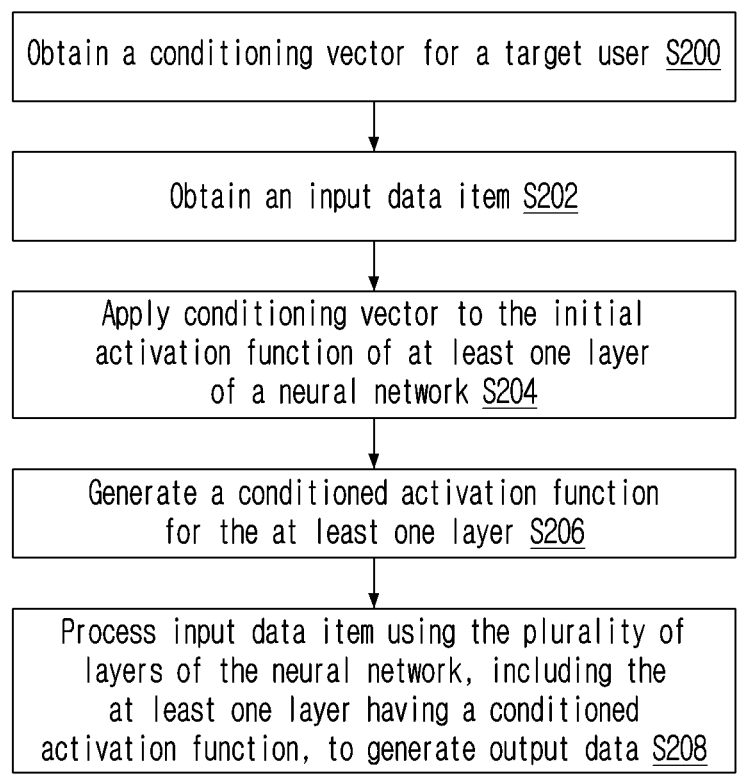
FIG. 10 is a flowchart of example steps to process input data at inference time using the trained conditional neural network of the present techniques.
Figure 11:
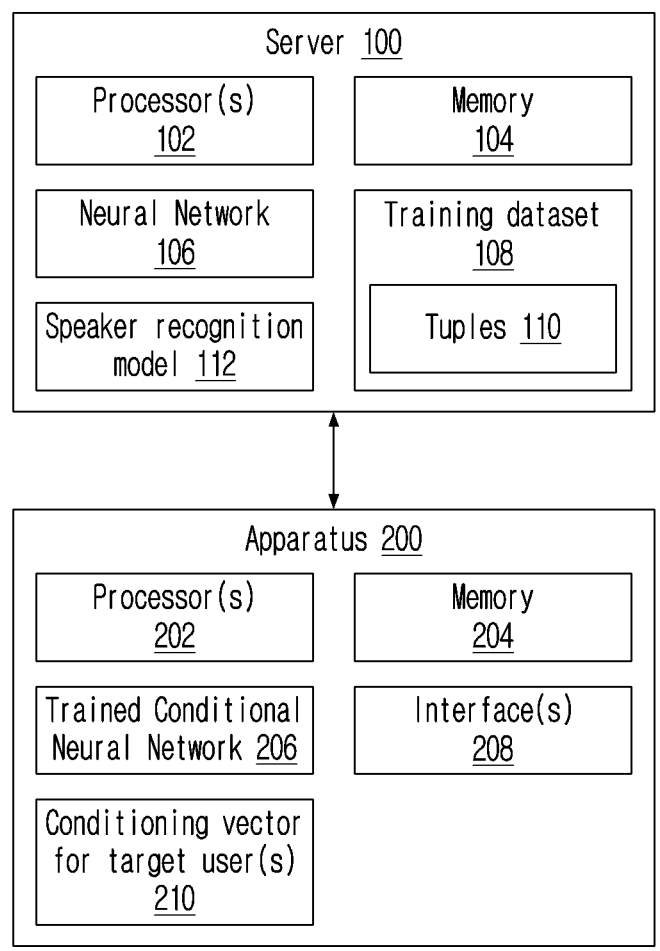
FIG. 11 is a block diagram of a server to train a conditional neural network and an apparatus to use the conditional neural network.

FIG. 10 is a flowchart of example steps to process input data at inference time using the trained conditional neural network of the present techniques. The method comprises: obtaining a conditioning vector for a target user of the user device (S200); obtaining an input data item (S202); and processing the input data item using the trained neural network by: applying the conditioning vector to an initial activation function of at least one layer (S204); generating a conditioned activation function for the at least one layer (S206); and processing the input data item using the plurality of layers of the neural network, including the layers having a conditioned activation function and outputting output data from the neural network (S208).

Hyper Parameters. The present conditioning approach utilises a set of standard activations provided for modelling. Therefore, the selection of these basic activations is an important hyper-parameter. The key characteristics that should be taken into account when searching for an optimal set of activations are:

Dynamically learned activation coefficients $s_j$ are all positive and sum to one. Thus, some families of activations will generate learned activations that remain in the same family, however, this not always true. For example, if all basic activations are all increasing functions, so is the learned activation. Monotonic increasing property of the learned activation may not be retained if we include both increasing and decreasing functions in the basic activation set;

The fact that $s_j$ are in the probability simplex means that the ranges of the basic activations play an important role in the final learned activations. One could consider basic activations with i) unbounded, ii) upper bounded, iii) lower bounded or iv) bounded ranges;

The basic activations could instead be picked from well known basis functions. For instance, Fourier basis or Chebyshev polynomials could be used to create bounded learned activations with compact support, and Hermite polynomials to create unbounded learned activations on the real line.

By way of example, in deep learning, the basic activation functions could be the set: $\{A_i: \mathbb{R} \to \mathbb{R}\}_{i=1}^{a}$={elu, exponential, hard_sigmoid, linear, relu, selu, sigmoid, softplus, softsign, swish, tanh}.

Another important hyper-parameter to consider is the values of the dynamically learned coefficients $s_j$ at initialization time for most conditioning vectors $z_j$. Given $s_j$ is a probability distribution, to start training with an unbiased model, they could be at initialization time approximately uniform, i.e., providing roughly the same weight to each of the basic activations for most $z_j$. Alternatively, they could be such that for most $z_j$ at the beginning of training the learned activations have a desired shape. Therefore, trainable variables w and b should be initialized considering i) the statistics of the conditioning vectors $z_j$, and ii) the shapes of the basic activations.

Regularizers. The present technique utilises two regularization techniques to promote certain qualitative properties in the learned activations during training.

The first technique encourages the learned activations to approximately select one element of $\{A_i: \mathbb{R} \to \mathbb{R}\}_{i=1}^{a}$, based on the conditioning vector. Different non-linear functions require different amount of computational resources, thus biasing the learned activations towards a single known form can improve efficiently, in comparison to their weighted combinations.

The second technique guides training so that similar/dissimilar conditioning vectors yield similar/dissimilar learned activations, thereby preserving the geometry of the embedding space in the conditioning mechanism. Considering a particular use-case of personalised sound enhancement (PSE), there might be some variation in the conditioning vectors (i.e., speech samples collected during enrolment). This turns into a challenge of selecting or aggregating these vectors to properly condition the network. The use of the second technique for regularization during training could reduce the impact of such variations in conditioning vectors at deployment phase by increasing the stability of the network against subtle variations in the conditioning vectors.

Learning approximately one-hot assignments. Sparse assignments can be encouraged by adding known regularizers, such as 'entroypy' or $\ell_1$ to a loss during training, scaled by a hyper-parameter $\alpha$, i.e., $\alpha H(s)$ or $\alpha \|s\|_1$. Alternatively, sparsity can be promoted by considering a temperature parameter $t \leq 1$. For example, a value lower than one makes the model more confident, whereas higher than one makes it less so. Thus sparse activation can be learned as: s:=$\mathrm{softmax}_{rowwise}(t^{-1}(z \times w + b))$.

Approximately preserving conditioning vectors geometry. Learned activations are built based on conditioning vectors, and it is therefore expected that they a discriminative property for the conditioning vectors they are based on. That is, clusters in $z_j$ space would be correlated to clusters in the space of learnt conditioned activations weights $s_j$ for similar/dissimilar conditioning vectors. However, strong correlation may not happen automatically due to: i) the dimension of the conditioning vectors is often much larger than the number of basic activation functions a, i.e., d>>a, ii) the manner in which $z_j$ is used to produce $s_j$ may be affected by the fact that softmax is invariant to translation, i.e., softmax(v+c)=softmax(v), and iii) the similarity/dissimilarity of the basic activations $\{A_i: \mathbb{R} \to \mathbb{R}\}_{i=1}^{a}$. High correlation can be promoted though by geometry aware high- to low-dimensional embeddings like t-distributed stochastic neighbour embedding 't-SNE'.

Although typically used for data visualization, the t-SNE objective function can be leveraged as a regularizer in a loss function. A loss function may be, for example, the mean square error for personalized speech enhancement or connectionist temporal classification for automatic speech recognition, or generally some other downstream task.

Specifically, taking t-SNE probabilities $p, q \in [0,1]^{b \times b}$ defined by $p_{i,i} q_{i,i} 0$ and for $i \neq j$:

$$p_{j|i} \frac{e^{-\|z_i-z_j\|^2/2\sigma^2}}{\Sigma_{k \neq i} e^{-\|z_i-z_k\|^2/2\sigma^2}}, \quad p_{i,j} \frac{p_{j|i}+p_{i|j}}{2b}, \quad q_{i,j} \frac{(1+\|s_i-s_j\|^2)^{-1}}{\Sigma_k \Sigma_{l \neq k}(1+\|s_k-s_l\|^2)^{-1}},$$

and add $\beta KL(p\|q)$ to the loss function, where $\beta$ is a hyper-parameter and KL denotes the Kullback-Leibler divergence. The minimization of the KL regularizer may be useful in applications, where conditioning vectors are naturally clustered such as in audio applications involving speaker embedding vectors, such as PSE, TTS, and speaker-dependent ASR. Also in applications with discrete latent vectors, where the preservation of the geometry of the conditioning vectors in the learned activations may offer superior results or better insights into the modelling internals.

Experiments. For particular applications, such as personalized speech enhancement, conditional activations based models are learned with standard input pipeline and training procedures as illustrated in FIGS. 3 and 4.

By way of example, the present technique was trained (and tested) using two representative data sets: LibriSpeech and Voxforge, which cover English and Spanish speech respectively. 100 hours and 360 hours of clean English speech were taken from LibriSpeech, which are recorded using close-talk microphones, without any background noise. To evaluate performances of learned activation on realistic data, a further training dataset was created by taking 32.5 hours of Spanish audio from Voxforge, which are mainly recorded with a far-field microphone and contain noise. Both datasets have audio recorded at 16 kHz.

Considering a pair of different speakers a and b, two speech samples are collected from a and one from b to create a tuple (speech$_a$, speech$_a$+speech$_b$, speech$_{a'}$, text$_{a'}$), with elements: i) a reference speech from user a to be passed through a speaker embedding model to create the conditioning vector z, ii) a different speech from user a corrupted (at various db levels) with speech from user b, iii) the ground-truth speech by user a present in the corrupted speech, and, iv) a transcript of the ground-truth speech by user a. All PSE models are trained in a supervised fashion, where the goal is to recover speech$_{a'}$ from speech$_a$+speech$_b$ as closely as possible for telephony applications and such that ASR(PSE (speech$_a$+speech$_b$))=text$_{a'}$ for ASR applications. It is also possible to evaluate performances under ambient acoustic noise by constructing (speech$_a$, speech$_a$+noise, speech$_{a'}$, text$_{a'}$) tuples, where noise is sampled from the DEMAND dataset.

In-line with standard practices, the trained model was evaluated in terms of source-to-distortion ratio improvement (SDRi) and word-error-rate (WER) metrics. A high SDRi indicates the improvement in signal quality for telephony and a low WER quantifies good transcription quality of the downstream ASR task.

Table 1 shows SDRi and WER performances on LibriSpeech (English) for architectures with learned activations (LA ticked) compared to a state of the art concatenation approach (LA cross). The models used are RNN models with skip connections, TDS models, and TDS-RNN which are encoder style models with a separator block in-between. Table 2 shows the same for VoxForge (Spanish).

sponding to the selected users. The plots highlight that LA exhibit different profiles across different users and layers. It can be observed that for all models that i) in each layer, different users have different LAs, and ii) each user has different LAs across different layers. As such the visualization of the internal mechanisms of LAs, provides a tangible way to improve how we understand the manner in which models leverage conditioning vectors to influence predictions.

Impact of Regularizers. Tables 3 & 4 show the SDRi and WER results on LibriSpeech and VoxForge respectively when using learned activations trained with entropy ($\alpha$) and t-SNE ($\{\beta, \sigma\}$) regularizers: note $\alpha,\beta \in \{0.00001, 0.0001,$

TABLE 1

| Model | Type | #Cond. | Params (M) | SDRi Babble | SDRi Ambient | WER Clean | WER Babble | WER Ambient |
|---|---|---|---|---|---|---|---|---|
| Identity | — | — | — | — | — | 8.2 | 89.4 | 17.3 |
| RNN | LA | 8 | 4.31 | 8.47 | 12.02 | 8.3 | 24.8 | 15.2 |
| RNN | FiLM | — | 5.34 | 7.39 | 11.41 | 9.4 | 31.2 | 16.4 |
| RNN | Concat. | — | 6.13 | 8.57 | 12.19 | 8.3 | 24.5 | 15.0 |
| TDS | LA | 42 | 2.51 | 7.33 | 11.58 | 8.2 | 33.0 | 15.7 |
| TDS | FiLM | — | 4.10 | 6.74 | 11.34 | 8.3 | 37.5 | 16.9 |
| TDS | Concat. | — | 4.89 | 7.78 | 11.72 | 8.3 | 30.0 | 15.7 |
| TDS-RNN | LA | 2 | 9.56 | 8.96 | 12.44 | 8.3 | 21.9 | 14.3 |
| TDS-RNN | FiLM | — | 9.87 | 8.36 | 12.08 | 9.0 | 25.4 | 15.2 |
| TDS-RNN | Concat. | — | 10.48 | 9.49 | 12.49 | 9.3 | 18.2 | 14.3 |

TABLE 2

| Model | Type | #Cond. | Params (M) | SDRi Babble | SDRi Ambient | WER Clean | WER Babble | WER Ambient |
|---|---|---|---|---|---|---|---|---|
| Identity | — | — | — | — | — | 1.2 | 89.1 | 9.2 |
| RNN | LA | 8 | 4.31 | 6.96 | 9.81 | 1.9 | 20.8 | 6.7 |
| RNN | FiLM | — | 5.34 | 5.92 | 8.33 | 3.0 | 25.5 | 8.2 |
| RNN | Concat. | — | 6.13 | 6.84 | 9.64 | 1.4 | 22.8 | 6.4 |
| TDS | LA | 40 | 2.51 | 5.37 | 8.21 | 1.4 | 33.3 | 7.7 |
| TDS | FiLM | — | 4.10 | 6.09 | 8.45 | 1.8 | 24.3 | 7.3 |
| TDS | Concat. | — | 4.89 | 5.19 | 8.02 | 1.6 | 35.6 | 7.6 |
| TDS-RNN | LA | 2 | 9.56 | 7.17 | 10.36 | 1.8 | 19.5 | 6.0 |
| TDS-RNN | FiLM | — | 9.87 | 7.23 | 9.91 | 2.3 | 18.0 | 6.4 |
| TDS-RNN | Concat. | — | 10.48 | 7.69 | 10.50 | 1.9 | 15.2 | 5.9 |

Looking to the tables, it is evident that models with both conditioning approaches improve telephony (high SDRi) and ASR (low WER) performances on both datasets. LA and concatenation-based conditioning approaches yield very similar performances, indicating high efficacy of the LA approach. Note that when evaluating ASR, it is also important that a good PSE model shows almost no degradation in WER, when clean audio is presented. Interestingly in some cases in concatenation-based approach, it is observed that higher success in removing babble noise, comes with an adverse impact in clean speech WER, mainly due to over-suppression. Furthermore, Tables 1 and 2 show that concatenation produces significantly larger models, i.e., up to 95% larger, compared to LA approaches (see the Params column).

Figure 7:
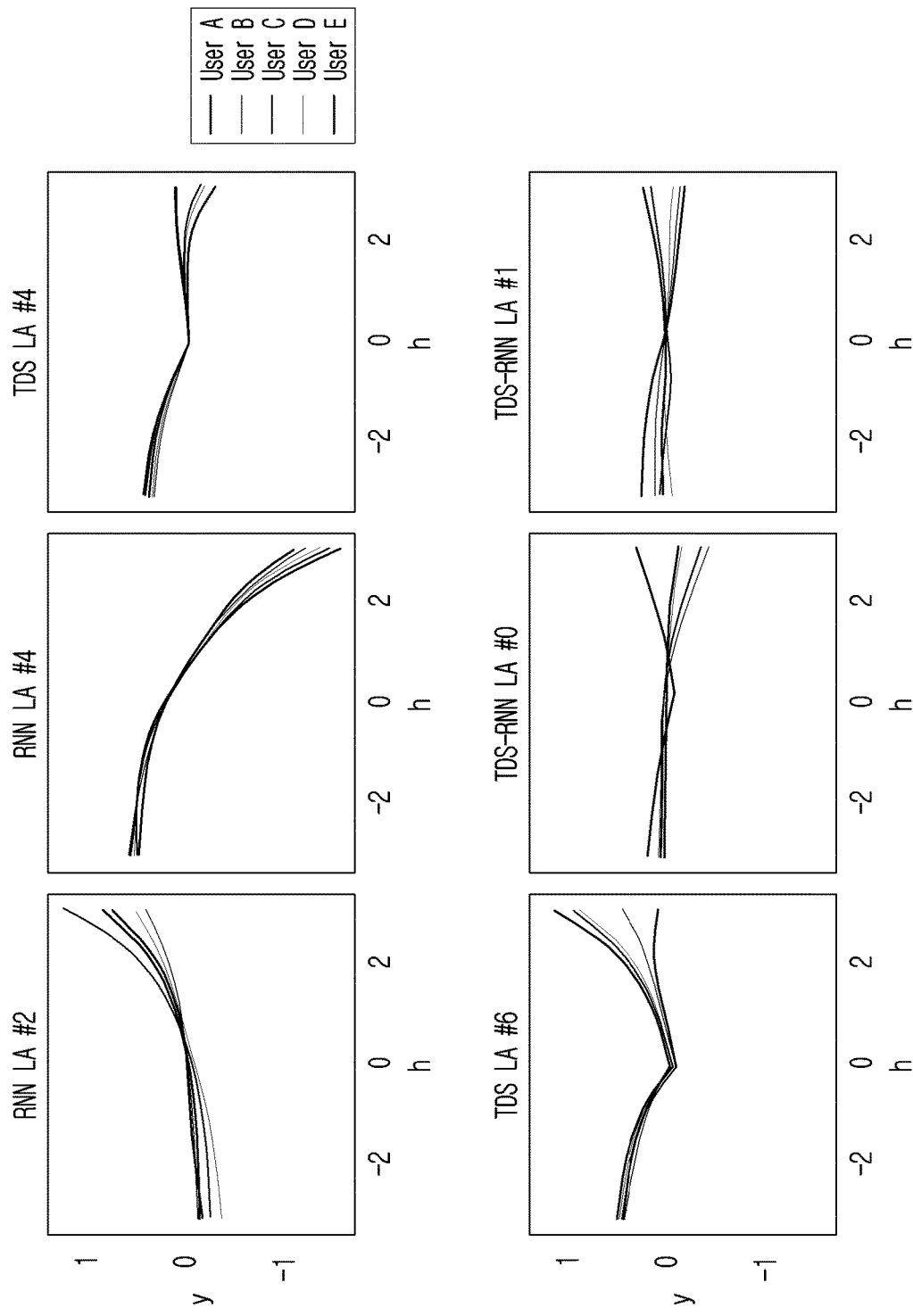
FIG. 7 shows graphs of how learned activations (LA) adapt based on conditioning vectors.

FIG. 7 shows how learned activations (LA) adapt based on conditioning vectors for models trained on VoxForge without regularizers, for speaker embedding vectors of randomly selected users in a PSE application. To take into account that basic activations may have different ranges, the plots show LAs minus average of basic activations, i.e., $LA(c|z_j) - a^{-1}\sum_{i=1}^{a} A_i(h)$ for $h \in [-3,3]$ and values of j corre- $0.001, 0.01\}$, $\sigma \in \{1\}$ and the same learning rates as for training models without regularizers was used.

TABLE 3

| | Regularizers | | SDRi | | WER | | |
|---|---|---|---|---|---|---|---|
| Model | En-tropy | t-SNE | Babble | Ambient | Clean | Babble | Ambient |
| RNN | 1e-4 | {0, 1} | 8.53 | 11.90 | 8.5 | 24.5 | 15.4 |
| TDS | 1e-3 | {0, 1} | 7.27 | 11.55 | 8.3 | 33.0 | 16.0 |
| TDS-RNN | 1e-5 | {0, 1} | 7.95 | 12.14 | 8.2 | 28.8 | 15.2 |
| RNN | 0 | {1e-4, 1} | 8.46 | 12.08 | 8.4 | 24.3 | 15.0 |
| TDS | 0 | {1e-5, 1} | 7.42 | 11.42 | 8.5 | 33.0 | 16.1 |
| TDS-RNN | 0 | {1e-5, 1} | 8.51 | 12.50 | 8.2 | 25.4 | 14.9 |

TABLE 4

| Model | Regularizers | | SDRi | | WER | | |
| --- | --- | --- | --- | --- | --- | --- | --- |
| | Entropy | t-SNE | Babble | Ambient | Clean | Babble | Ambient |
| RNN | 1e–5 | {0, 1} | 7.08 | 9.74 | 1.6 | 18.6 | 5.9 |
| TDS | 1e–5 | {0, 1} | 5.85 | 8.61 | 2.1 | 27.0 | 7.1 |
| TDS-RNN | 1e–5 | {0, 1} | 5.51 | 9.34 | 1.3 | 33.3 | 6.8 |
| RNN | 0 | {1e–5, 1} | 7.36 | 10.12 | 2.6 | 16.9 | 5.9 |
| TDS | 0 | {1e–2, 1} | 5.68 | 8.62 | 1.8 | 29.0 | 7.1 |
| TDS-RNN | 0 | {1e–5, 1} | 6.33 | 9.92 | 1.4 | 25.2 | 6.5 |

Compared with Table 1 & 2, the results clearly demonstrate an improvement in performance of RNN and TDS models when trained with either of the regularizers. The performance gain is consistent across both datasets, but there is a trade off with the impact on clean speech. Moreover, it is observed that entropy regularizer is outperformed by t-SNE regularizer. This could be due to the fact that t-SNE regularizer is less restrictive allowing a wider range of combinations of the basic activations. Whereas, entropy regularizer promotes the selection of only one of the basic activations.

Interestingly, the TDS-RNN models, which performed best without regularizers, get worse performance with regularizers. This could be due to limited number of filter layers (i.e., only 2, compared with 8 and 42 for RNN and TDS models respectively) present in the model architecture. Given that LA was given only 11 basic activation to learn from, there could be merely 121 (i.e., $11^2$) unique separations learned by LA. This makes it difficult for these models to successfully differentiate between all unique conditioning vectors which might contain way more separations.

Figure 8A:
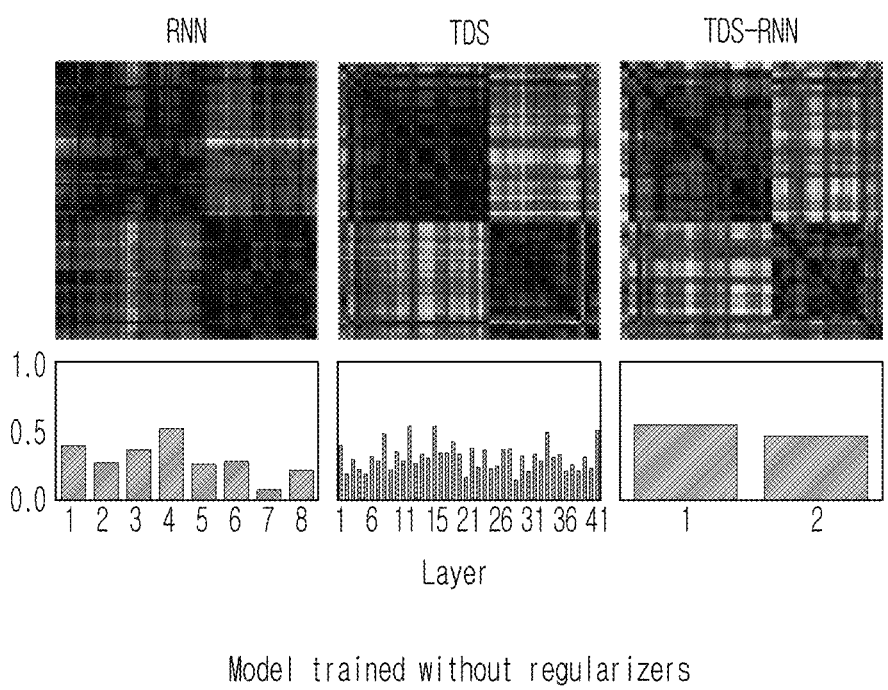
FIGS. 8A, 8B, and 8C show correlation values between distance matrices of softmax values of learned activations and of conditioning vectors for each learned activation.
Figure 8B:
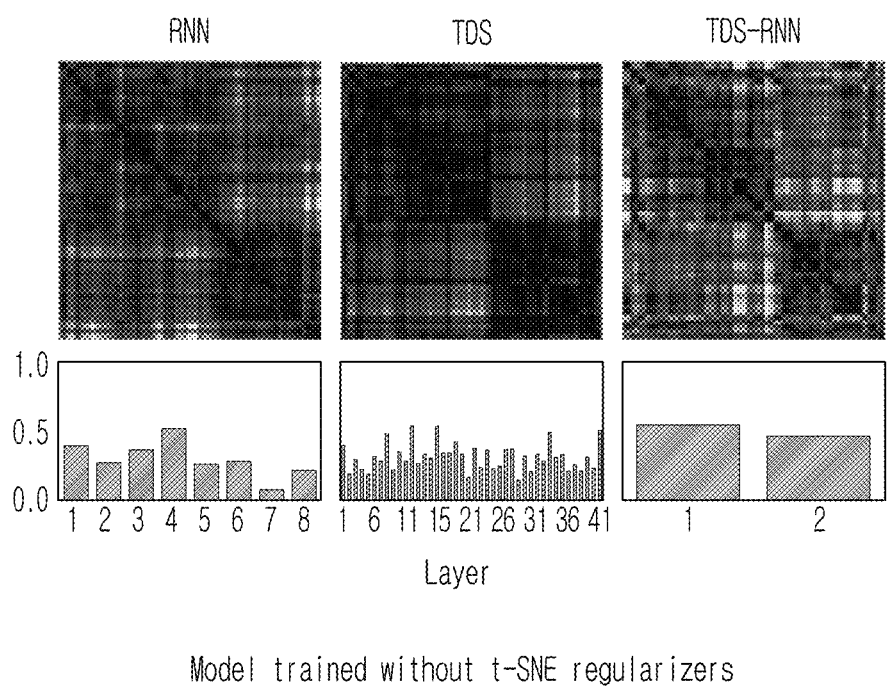
Figure 8C:
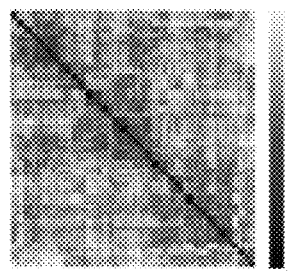

Correlation Analysis. FIGS. 8A, 8B, and 8C show correlation values between distance matrices of softmax values (of LA) and of conditioning vectors for each LA. Correlation analysis allows one to understand the manner in which the models leverage the conditioning vectors together with inputs to predict outputs.

For a random selection of embedding vectors $\{z_j\}_{j=1}^{100}$, weights $s_j^{(l)}$ with $j \in \{1, \ldots, 100\}$ of the l LAs of a model are computed. Then the distance matrices for $z_j$ and $s_j^{(l)}$ are computed, hereafter referred to as Z and $S^{(l)}$; the distance matrix is computed by taking the pair-wise cosine distances. To get insights about how LAs perform conditioning, the Spearman correlation between vec(Z) and vec($S^{(l)}$) is calculated. This correlation is computed for all LAs (i.e., 8, 42 and 2 for RNN, TDS, TDS-RNN models). Thus the impact of the conditioning vector across the depth (i.e., position of the LA) in the network may be measured.

Looking at the bottom row of FIGS. 8A to 8C, it can be seen that there is a large variability in correlation values as the number of layers increases. There is not very strong correlation with a specific LA, possibly as a result of performing the conditioning at different stages.

The top row of FIGS. 8A to 8C shows the distance matrices $S^{(l)}$ (for l which has the highest correlation), as well as Z (in the last column). The overall structure of Z is approximately block diagonal with three blocks, which is not well preserved when learning without regularizers given the blocks collapse to two, but is well preserved when learning with regularizers. This is especially significant given that conditioning vectors are high dimensional (in this example 256) but the weight vectors in LAs are low dimensional (in this case 11). We also observe that the models with less number of LAs preserve much similar structure between $S^{(l)}$ and Z. Given the networks have similar performance, this indicates that as the number of LAs decrease, the networks enforce higher degree of conditioning per LA.

Deployment. Unlike the training phase, during the deployment phase we compute the user's conditional activation through their enrolment data (i.e. input A in FIG. 9). This process is done only once during the setup phase.

Specifically, for the particular case of on-device personalized sound enhancement, the system setup would work by first taking enrolment data from a user, say asking the user to utter the sentence "Hi Bixby!", which would be passed through a speaker embedding network, for a one-time computation of a speaker embedding conditioning vector which serves to capture the sound characteristics/profile of the user. Then, there would be also a one-time cost of constructing the conditioned learned activations based on the conditioning vector. With these two steps done at enrolment time, the network would run at inference time as normal by passing different audio captures depicted as "corrupted speech" in FIG. 3.

Beneficially, the present approach condenses the sum of activations multiplied by coefficients into a single learned activation which lends itself to increased hardware performance. This is because, rather than having to transform inputs via a standard activations, the approach only requires transforming inputs via 1 learned activation.

Inference Optimisations. Given the proposed conditioned activations (c.f. FIG. 2) avoid the need to concatenate inputs and vectors, they provide significant savings in terms of intermediate results that need to be computed, written and read during inference (this is especially pronounced in time series data where each time frame of the inputs needs to be concatenated with the vectors). However, if applied naively they may use more resources than necessary (c.f., FIG. 5). We thus construct post-training strategies that reduce the inference cost of conditioned activations for reduced latency, dynamic memory and computation at deployment time.

Magnitude Pruning. One strategy is removing any number of 'weaker' activations, with the extreme of taking only that with the 'strongest' activation:

$$i^*(j) = \operatorname{argmax}_{i \in \{1, \ldots, a\}} s_{j,i},$$

$$y_{j, \ldots} = \operatorname{activation}_{i^*(j)}(x_{j, \ldots}).$$

Note that as in other continuous relaxation techniques such as DARTS, there exist many other criteria other than magnitude such as signal strength that can be used for pruning, which can be used towards this end.

Activation Distillation/Interpolation/Extrapolation. To decrease computation and latency at inference time, for each user j, another strategy is to create a one-time approximation of the learned weighted activations $$\mathrm{learne\widetilde{dAct}ivation}(c|z_j) \approx \sum_{i=1}^{a} s_{j,i} * \mathrm{activation}_i(c),$$

so that rather than having to pass $c \in \mathbb{R}$ per each activation$_i(\bullet)$ instead pass c only through learne$\widetilde{\mathrm{dAct}}$vation($\bullet|z_j$).

FIG. 10 is a block diagram of a system for training and using a conditional neural network. The system comprises a server 100 comprising at least one processor 102 coupled to memory 104. The server 100 comprises a neural network 106 having a plurality of layers, where each layer is associated with an initial activation function. The at least one processor 102 is arranged to: obtain a training dataset 108 to be processed by the neural network 106, the training dataset comprising a plurality of tuples 110, each tuple 110 comprising a conditioning vector and input data. The server 100 is arranged to train the neural network 106 by: applying the conditioning vector of each tuple 110 to the initial activation function of at least one layer; generating a conditioned activation function for the at least one layer; and processing the input data of each tuple 110 using the plurality of layers of the neural network 106, including the at least one layer having a conditioned activation function, to generate output data.

The system comprises an apparatus 200 comprising at least one processor 202 coupled to memory 204. The apparatus is arranged to receive a trained, conditional neural network 206 from the server. The at least one processor 202 may be arranged to: obtain a conditioning vector for a target user of the apparatus 200; obtain an input data item; and process the input data item using the trained neural network 206 by: applying the conditioning vector to an initial activation function of at least one layer; generating a conditioned activation function for the at least one layer; and processing the input data item using the plurality of layers of the neural network, including the layers having a conditioned activation function; outputting output data from the neural network.

The apparatus 200 may be any one of: a smartphone, tablet, laptop, computer or computing device, virtual assistant device, a robot or robotic device, a robotic assistant, image capture system or device, an Internet of Things device, and a smart consumer device. It will be understood that this is a non-limiting and non-exhaustive list of apparatuses. It will be understood that the conditioning of the neural network could be performed on the same device, or could be performed on a different device and downloaded for use by the apparatus 200.

The at least one processor 202 may comprise one or more of: a microprocessor, a microcontroller, and an integrated circuit. The memory 204 may comprise volatile memory, such as random access memory (RAM), for use as temporary memory, and/or non-volatile memory such as Flash, read only memory (ROM), or electrically erasable programmable ROM (EEPROM), for storing data, programs, or instructions, for example.

The apparatus 200 comprises at least one interface 208 for receiving input data items (to be processed by a conditioned neural network), and possibly reference data items (to generate conditioning vectors for conditioning a neural network). The interface 208 may be, for example, a display, an image capture device, a microphone, a sound speaker, etc. The at least one interface 208 may be used to obtain the at least one training data item used to personalise the trained neural network 206.

Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

What is claimed is:

1. A computer-implemented method for training, on a server, a neural network having a plurality of layers, where each layer is associated with an initial activation function, the method comprising:
   obtaining, by one or more processors of the server, a training dataset comprising a plurality of tuples, each tuple comprising a conditioning vector and input data, to be processed by the neural network; and
   training, by the one or more processors of the server, the neural network for using, on a user device, by:
      applying, by the one or more processors of the server, the conditioning vector of each tuple to the initial activation function of at least one layer,
      generating, by the one or more processors of the server, a conditioned activation function for the at least one layer, and
      processing, by the one or more processors of the server, the input data of each tuple using the plurality of layers of the neural network, including the at least one layer having a conditioned activation function, to generate output data,
      each of the plurality of layers of the neural network includes a plurality of weight values and performs neural network computation operation by calculating a result of computation by a previous layer and the plurality of weight values,
   wherein the neural network is for sound enhancement and/or automatic speech recognition,
   wherein the input data of each tuple of the training dataset comprises at least one audio noise sample and at least one clean audio sample that each contain speech of individual speakers, and
   wherein the conditioning vector is a speaker embedding vector for each individual speaker.

2. The method of claim 1, wherein the training of the neural network comprises using a regularization technique to reduce variation in the conditioned activation functions of the layers of the neural network.

3. The method of claim 2,
   wherein the regularization technique utilizes two regularization techniques to promote certain qualitative properties in learned activations during the training of the neural network,
   wherein a first regularization technique encourages the learned activations to approximately select one element based on the conditioning vector, and
   wherein a second regularization technique guides the training of the neural network for similar/dissimilar conditioning vectors to yield similar/dissimilar learned activations.

4. The method of claim 1, wherein the applying of the conditioning vector of each tuple to the initial activation function of at least one layer comprises:
   modifying weights of the initial activation function using the conditioning vector.

5. The method of claim 1, wherein the applying of the conditioning vector of each tuple to the initial activation function of at least one layer comprises:
   modifying at least one characteristic of the initial activation function using the conditioning vector.

6. The method of claim 5, wherein the modifying of the at least one characteristic of the initial activation function comprises searching for an optimal activation function and modifying at least one characteristic of the initial activation function based on the optimal activation function.

7. The method of claim 1 wherein the training of the neural network comprises training the neural network to remove the noise from corrupted audio samples while maintaining the speech of the individual speakers.

8. The method of claim 1, further comprising:
generating the speaker embedding vector for each individual speaker by:
obtaining at least one clean audio signal for an individual speaker, and
applying a speaker recognition model to the at least one clean audio signal to generate a speaker embedding vector representing a speech profile of the individual speaker.

9. The method of claim 1,
wherein the neural network is for text-to-speech conversion,
wherein the input data of each tuple of the training dataset comprises at least one text sample and a corresponding audio sample, and
wherein the conditioning vector is an embedding vector representing a target voice for the speech.

10. A server for training a neural network having a plurality of layers, where each layer is associated with an initial activation function, the server comprising:
memory storing one or more computer programs; and
one or more processors communicatively coupled to the memory,
wherein the one or more computer programs include computer-executable instructions that, when executed by the one or more processors individually or collectively, cause the server to:
obtain, by the one or more processors of the server, a training dataset comprising a plurality of tuples, each tuple comprising a conditioning vector and input data, to be processed by the neural network, and
train, by the one or more processors of the server, the neural network for using, on a user device, by:
applying, by the one or more processors of the server, the conditioning vector of each tuple to the initial activation function of at least one layer,
generating, by the one or more processors of the server, a conditioned activation function for the at least one layer, and
processing, by the one or more processors of the server, the input data of each tuple using the plurality of layers of the neural network, including the at least one layer having a conditioned activation function, to generate output data,
each of the plurality of layers of the neural network includes a plurality of weight values and performs neural network computation operation by calculating a result of computation by a previous layer and the plurality of weight values,
wherein the neural network is for sound enhancement and/or automatic speech recognition,
wherein the input data of each tuple of the training dataset comprises at least one audio noise sample and at least one clean audio sample that each contain speech of individual speakers, and
wherein the conditioning vector is a speaker embedding vector for each individual speaker.

11. A computer-implemented method for using, on a user device, a trained neural network having a plurality of layers, the method comprising:
obtaining, by one or more processors of a server, a conditioning vector for a target user of the user device;
obtaining, by the one or more processors of the server, an input data item; and
processing, by the one or more processors of the server, the input data item using the trained neural network for using, on the user device, by:
applying, by the one or more processors of a server, the conditioning vector to an initial activation function of at least one layer,
generating, by the one or more processors of the server, a conditioned activation function for the at least one layer,
processing, by the one or more processors of the server, the input data item using the plurality of layers of the neural network, including the layers having a conditioned activation function, and
outputting, by the one or more processors of the server, output data from the neural network,
each of the plurality of layers of the neural network includes a plurality of weight values and performs neural network computation operation by calculating a result of computation by a previous layer and the plurality of weight values,
wherein the neural network is for sound enhancement and/or automatic speech recognition,
wherein the input data of each tuple of a training dataset comprises at least one audio noise sample and at least one clean audio sample that each contain speech of individual speakers, and
wherein the conditioning vector is a speaker embedding vector for each individual speaker.

12. The method of claim 11, wherein, when the trained neural network is for sound enhancement and/or automatic speech recognition, the conditioning vector for the target user is a speaker embedding vector for the target user.

13. The method of claim 12, further comprising:
generating the speaker embedding vector for the target user by:
obtaining at least one clean audio signal of the target user, and
applying a speaker recognition model to the at least one clean audio signal of the target user to generate the speaker embedding vector representing a speech profile of the target user.

* * * * *